United States Patent [19]
Rieger

[11] Patent Number: 5,308,139
[45] Date of Patent: May 3, 1994

[54] SEAT COVER
[75] Inventor: Paul J. Rieger, Arrington, Tenn.
[73] Assignee: Outboard Marine Corporation, Waukegan, Ill.
[21] Appl. No.: 924,744
[22] Filed: Aug. 4, 1992
[51] Int. Cl.⁵ .............................................. A47C 7/62
[52] U.S. Cl. .............................. 297/184.11; 297/181; 297/229
[58] Field of Search .................. 297/184.11, 219, 224, 297/229, 181

[56] References Cited

U.S. PATENT DOCUMENTS

| 2,243,984 | 6/1941 | Singewald | 297/184 X |
| 3,479,085 | 11/1969 | Weinstein | 297/219 |
| 4,131,312 | 12/1978 | Price | 297/184 |
| 4,273,380 | 6/1981 | Silvestri | 297/229 X |
| 4,320,922 | 3/1982 | Meritis | 297/220 |
| 4,518,198 | 5/1985 | Daniels | 297/229 |
| 4,790,592 | 12/1988 | Busso et al. | 297/184 |
| 4,958,886 | 9/1990 | Barattini et al. | 297/224 X |
| 5,005,901 | 4/1991 | Hinde | 297/229 |
| 5,150,945 | 9/1992 | Aupperlee et al. | 297/184 |

FOREIGN PATENT DOCUMENTS 8700408  1/1987  World Int. Prop. O. .......... 297/229

Primary Examiner—Peter M. Cuomo
Assistant Examiner—Suzanne L. Dino
Attorney, Agent, or Firm—Welsh & Katz, Ltd.

[57] ABSTRACT

A seat cover for covering and protecting a seat when the seat is not being used. The seat cover has a collapsible jacket being securing to one end of the seat and having a free end that is releasably securable to the opposing end of the seat. The jacket is dimensioned to substantially overlay the portions of the seat which are generally exposed to the elements when not in use. A pouch is also provided for storing and protecting the jacket when the jacket is not in use. The pouch may be permanently or releasably affixed to the seat.

20 Claims, 4 Drawing Sheets

SEAT COVER

The present invention relates generally to a collapsible seat cover which is configured to overlay and protect a seat from exposure to the elements, and which is stored and retrieved from a pouch attached to the seat.

BACKGROUND OF THE INVENTION

Seats, particularly for convertible automobiles and open air watercraft, are typically made from vinyl, leather or other non-fabric and smooth coverings that protect the inner cushion of the seat. The seat coverings, especially on watercraft, are exposed to the sun, rain and wind for extended periods of time. Exposure to the elements may cause some seat coverings to fade, change colors or even crack and tear after prolonged and unprotected exposure. In certain watercraft, such as recreational boats, and in automobiles, the seat covers may have been specially designed or custom-made to match the design, color and style of the boat or automobile. Such seat covers, especially those that are custommade or made of leather, are expensive and often difficult to replace.

A damaged or weatherworn seat cover is unattractive and may diminish the resale value of the boat or automobile. Further, if the seat cover becomes cracked or torn, the underlying cushion may become waterlogged or simply begin to deteriorate from the exposure to sun and water, and will need premature replacement. It is common, even if the seat cover is not cracked or torn, that water will penetrate the seat cover and not only cause premature deterioration of the seat cushion, but also make it quite uncomfortable for the person who sits on that seat.

Currently known and available seat protection typically entails the use of supplemental seat covers that are held to the seat by a complicated system of hooks and/or elastic bands and buttons. These supplemental seat covers are typically stored separately from the seat, must be retrieved when used and subsequently returned to storage thereafter. Additionally, known currently available supplemental seat covers often collect water, thereby making it unpleasant and messy to remove the seat cover. Some people may simply decide to leave the seats exposed instead of expending the effort of having to search for and install the cover over the seat. Additionally, some people may apply specially formulated treatment creams to the seats. These treatment creams may offer some limited protection to sun and water, but are typically messy, expensive and only short term solutions.

Thus, there is a need for a seat cover which protects seats from damage and deterioration due to exposure to the sun, wind and water which is inexpensive and which is easy to use. There is also a need for a seat cover that is stored and integral with the seat, and which may be sold as a unit along with the seat.

Accordingly, it is an object of the present invention to provide an improved seat cover which is inexpensive and easy to use, and which will effectively protect a seat from exposure to sun, wind, water and the like.

Another object of the present invention to provide a pouch which is secured to the seat and which is dimensioned to store and protect a seat cover.

Yet another object of the present invention is to provide a seat cover, which is stored within a pouch, and which can be folded out of the pouch for application over the seat to protect the seat from exposure to sun, wind, water and the like.

Other features and advantages of the present seat cover and cover pouch will become apparent upon review of the following detailed description, claims and drawings.

DETAILED DESCRIPTION OF THE INVENTION

In accordance With the present invention, all of these objects as well as others not herein specifically identified, are achieved generally by the present seat cover and cover storage pouch. Broadly stated, the present seat cover includes a seat cover for covering and protecting a seat when the seat is not being used, the seat being of the type having a first end and an opposite second end. The seat cover has a collapsible jacket having a securing end secured to the first end of the seat and a free end that is releasably securable to the second end of the seat. The jacket has sufficient surface area to substantially overlay the seat between the first end and the second end. The jacket is designed so that the free end can be releasably secured to the first end of the seat. A pouch is included for storing and protecting the jacket when the jacket is not in use. The pouch itself is attached to the first end of the seat, either releasably or permanently, and can together with the jacket form a cover unit.

Figure 1:
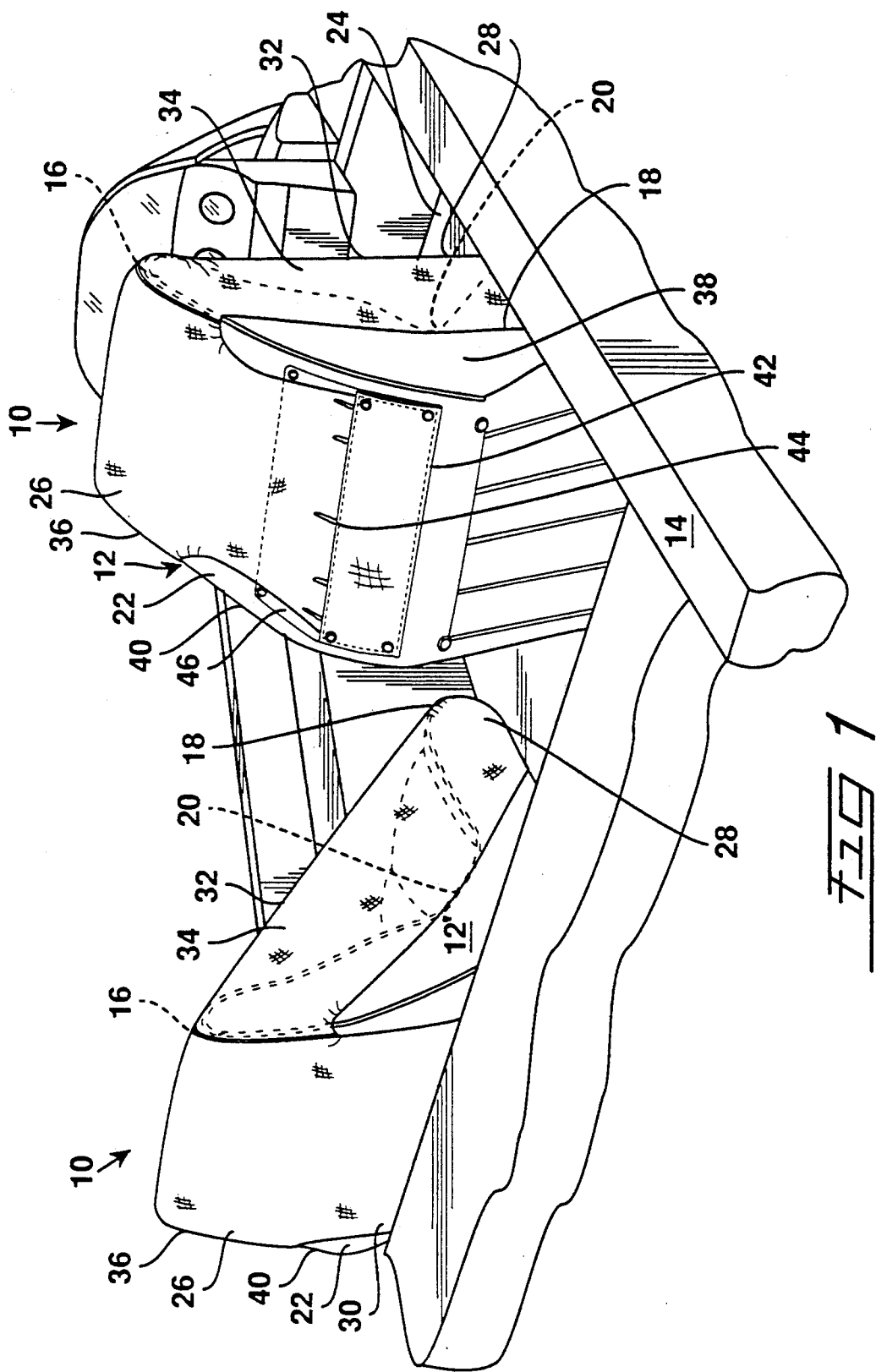
FIG. 1 depicts a preferred embodiment of two seat covers, withdrawn from their respective cover pouches and shown covering the seats of a boat.

More specifically, referring to FIG. 1, the present seat cover is generally designated at 10. Throughout the several figures, the invention is shown adapted to a typical boat seat indicated generally at 12, which is mounted to a boat body 14. However, it should be understood that the present seat cover 10 can work equally as well if adapted to a car seat, motorcycle seat or any other type of seat which can utilize a covering to protect it from exposure to the elements. However, it is perceived that the seat cover 10 will be most useful in applications involving boat seats, since boat seats are generally exposed to the elements for greater lengths of time than other types of seats.

The seat 12 will be described for illustrative purposes only, and should not be taken as a limitation to the invention. The seat 12 includes a first end 16 and a second end 18 which opposes the first end 16. The seat also includes a front side 20 and a rear side 22. The seat 12 will typically be removably secured to the deck 24 of the boat 14. It is perceived that the present seat cover 10 will be best utilized with bucket-type seats which are pivotally mounted and which can be moved forward, as shown, to access the seat cover 10. Nevertheless, the seat cover 10 will work equally as well if adapted to ordinary fold down seats.

The present seat cover 10 includes a foldable, collapsible jacket 26, which has a free end 28 and a securing end 30. The jacket 26 has a front surface area 32, which is large enough to substantially cover or overlay the front side 20 of the seat 12 from at least the front first end 16 to the second end 18. The jacket 26 is preferably made of a resilient and water repellant material, which is also collapsible and soft. The resiliency of the material is desirable since it is preferred that the cover 10 stretched over and tautly cover the seat 12.

Figure 5:
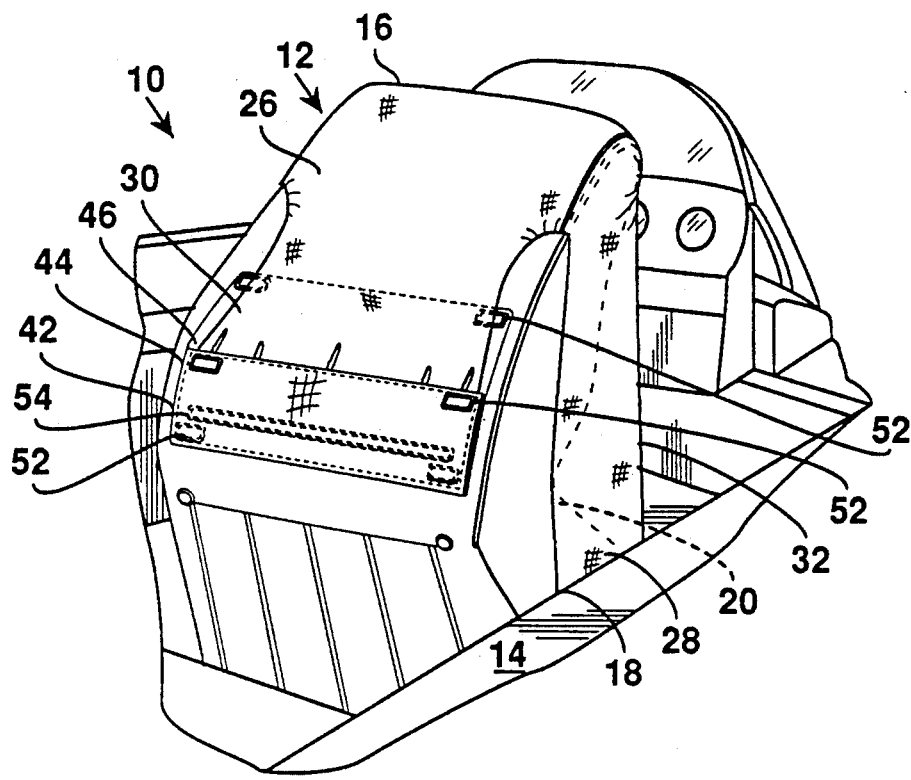
FIG. 5 depicts the present seat cover withdrawn from the cover pouch wherein the pouch and jacket are fastened to the seat, using Velcro ®.

As shown in FIGS. 1 and 5, upon application of the present cover 10, the jacket 26 can be pulled taut over the seat 12 and removably secured along its free end 28 to the second end 18 of the seat 12. It is preferred that jacket 26 be pulled taut over the seat 12 when fully extended to increase the water protection of the seat 12 by forming an inclined surface upon which the water rolls off and cannot collect, shown best covering seat 12' of FIG. 1. If the jacket 26 does not fit tautly over the seat 12, then water may collect and form a pool on the cover 10, which may be absorbed into the seat 12 and also make it difficult and messy to remove the cover 10. Finally, for aesthetic reasons, the jacket 26 can include a design or a color scheme that substantially matches the design or color scheme of the boat 14 or the seat 12.

The jacket 26 is also configured having sides 34 and 36 which are large enough to protect the respective sides 38 and 40 of the seat 12 from exposure to the elements. It should be understood that it is not necessary that the jacket 26 fully envelope or overlay the entire surface area of the seat 12. Instead, the jacket 26 will adequately protect the seat 12 if the front surface 32 covers the front side 20 and the sides 34 and 36 canopy or substantially cover the sides 38 and 40 of the seat 12.

When it is desired to cover the seat 12, the jacket 26 can be extended over the seat 12 and be removably secured along the second end 18 of the seat 12. Specifically, the free end 28 of the jacket 26 is removably securable to the second end 18 of the seat 12. It is important that once the jacket 26 is stretched over the seat 12 and the free end is secured to the second end 18, the free end 28 does not slip off or become easily dislodged, thereby uncovering the seat 12. Preferably, the material used for the jacket 26 will have sufficient resiliency or elasticity to cause the free end 28 to be properly secured to the second end 18 of the seat 12. However, it is also contemplated that strips of Velcro ® material (hook and loop fastening material), an elastic band or other known, available securing means can be utilized to insure that the free end 28 remains secured to the second end 18 of the seat 12 during use of the seat cover 10.

Figure 2:
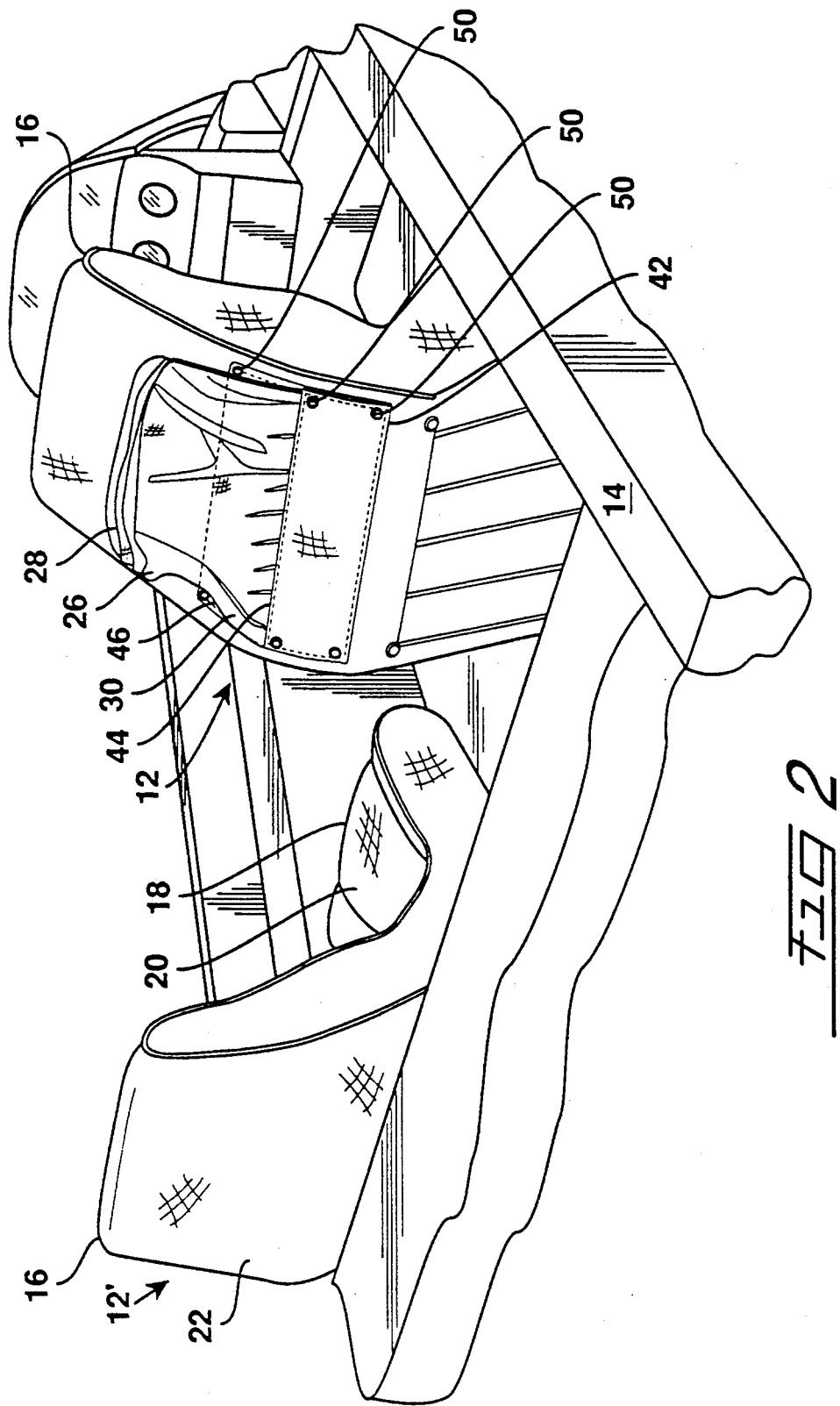
FIG. 2 depicts one of the present seat covers being partially withdrawn from the cover pouch.

Referring to FIGS. 1 and 2, it is shown that the cover 10 also includes a storing pouch 42. The pouch 42 is dimensioned to retain the jacket 26 within an inner pocket 44 when the jacket 26 is not in use. The pouch 42 is preferably located on the rear side 22 of the first end 16 of the seat 12. However, it is anticipated that the pouch 42, as well as the jacket 26, can work equally as well if located along other portions of the seat 12.

The pouch 44 can be removably attached to the seat 12 by using ordinary fastening means such as buttons, snaps, or even Velcro ® type strips of material (hook and loop fastening material). If removably attached, the pouch 42 and jacket 26 can be secured to and be removed from the seat 12 as a unit to simplify storage and increase mobility and transportability of the cover 10. Alternatively, the pouch 42 may be permanently attached to the seat 12 such as by sewing it or otherwise adhering the pouch 42 to the rear side 22 of the seat 12. Also, the pouch 42 should be made of a water repellant material to protect the jacket 26 when stored therein. In FIG. 2, snaps or buttons 50 are used, whereas in FIG. 1, the pouch 42 is sewn onto the seat 12. Also, In FIG. 5, Velcro ® patches are used to attach the pouch 42 to the seat 12. As with the jacket 26, the pouch 42 can be made to match or coordinate with the color scheme and design of the boat 14 or the seat 12. As shown in FIG. 2, the jacket 26 is partially removed from the pouch 42 for application to the seat 12 or for being collapsed back into the inner pocket 44 for storage within the pouch 42.

Figure 4:
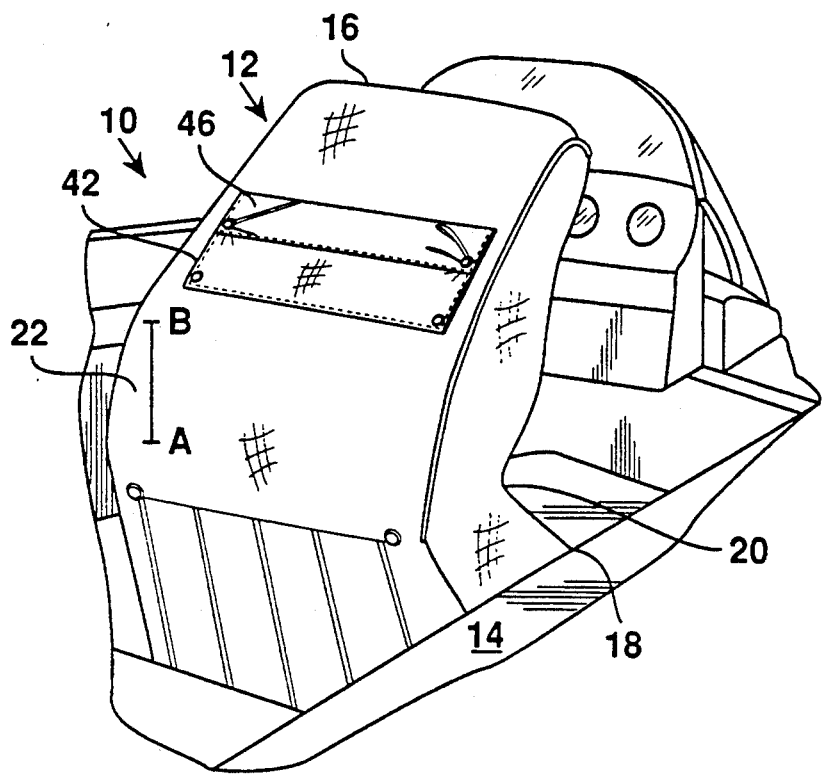
FIG. 4 depicts the present seat cover in another alternative location on the rear of the seat.

The pouch 42 includes a protective flap 46 which is integral with the pouch 42. As shown in FIG. 4, the flap 46 substantially covers the opening into the inner pocket 44 to cover and protect the jacket 26 when the jacket 26 is stored in the pouch 42. The protective flap 46 may include buttons or snaps 50 (FIG. 2) or Velcro ® patches 52 (FIG. 5) to enable the user to close the pouch 42 when the jacket 26 is not in use. Alternatively, the pouch 42 and protective flap 46 may include a zipper which allows the user to zip the pouch 42 closed when the jacket 26 is not being used.

As shown in FIG. 5, the securing end 30 of the jacket 26 is secured to the pouch 42, preferably within the inner pocket 44, so that the jacket 26 will be fully covered when it is stored in the pouch 42. More specifically, the securing end 30 can be removably secured to the pouch,, 44 using buttons, snaps or strips of Velcro ® type material (hook and loop fastening material). In FIG. 5, the jacket 26 is attached to the pouch 42 using a strip 54 of Velcro ®. If the jacket 26 is removably secured to the pouch 42, it can be easily separated from the pouch 42 for cleaning, storage or replacement without having to remove the pouch 42 from the seat 12. Alternatively, the jacket 26 can be permanently secured along its securing end 30 to the pouch 42, or within inner pocket 44, such as by sewing it to the pouch 42. Further, it is anticipated that for certain applications of the seat cover 10, it may be necessary to secure the jacket 26 to the rear side 22 of the seat 12 so that the jacket 26 is entirely independent from the pouch 42.

Figure 3:
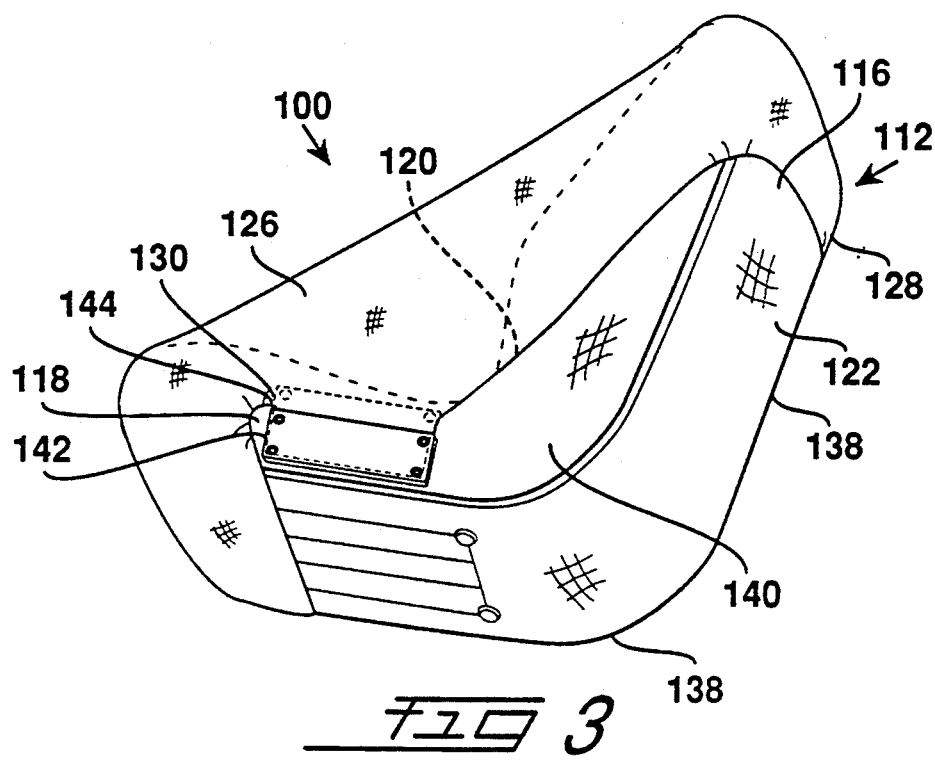
FIG. 3 depicts an alternative embodiment of the present seat cover wherein the present seat cover is located along a side of the seat.

Referring to FIG. 3, an alternative embodiment of the cover 10 is shown and is designated generally at 100. The cover 100 is identical to cover 10, however, the pouch 142 of cover 100 is secured, either permanently or removably, along the side 140 of the seat 112. The alternative cover 100 is particularly useful when used with seats that are not forwardly pivotal. In FIGS. 1, 2 and 5, seat 12 being adapted with the cover 10, shows a pivotally moveable type of seat wherein the pouch 42 is easily accessible to the user by pivoting the seat 12 forward. However, if a seat 112, which is not pivotally moveable, then the cover 100 would be easily accessible to the user. If the alternative cover 100 is employed, then the free end 128 of the jacket 126 will extend from the pouch 142 located on side 140 along the second end 118 and over the front side 120 where it is then secured to the opposite side 138 of the seat 112 to substantially overlie and protect the seat 112. as with the preferred seat cover 10. As in the preferred embodiment, the jacket 126 will be secured either permanently or removably to the pouch 142 along a securing end 130. Again, the pouch 142 may include a protective flap 144.

For aesthetics reasons, as well as for protecting the seat cover 10 from damage, the pouch 42 will preferably be located on the rear side 20 of the seat 12 such that when the seat 12 is in a down position or in use, the pouch 42 and/or jacket 26 are hidden and unaccessible. In FIGS. 1 and 2, it is shown that the pouch 42 and jacket 26 remain concealed and inaccessible when the seat 12' is not pulled forward. Accordingly, the pouch 42 and jacket 26 are only accessible when the seat 12, such as seat of FIGS. 1 and 2, is pivoted up or folded over. If it is desired that the jacket 26 and pouch 42 be fully accessible when seat 12 is not moved forward or folded, then the cover 10 can be located up higher on the rear side 20 of the seat 12, such as shown in FIG. 4. Instead of being located at preferred point A of seat 12, the pouch 42 of FIG. 4 is located at point B so that the pouch 42 is not accessed when the seat 12 is down or in use. To this end, the cover 10 can be easily reached by the user without having to move the seat 12 forward.

Figure 6:
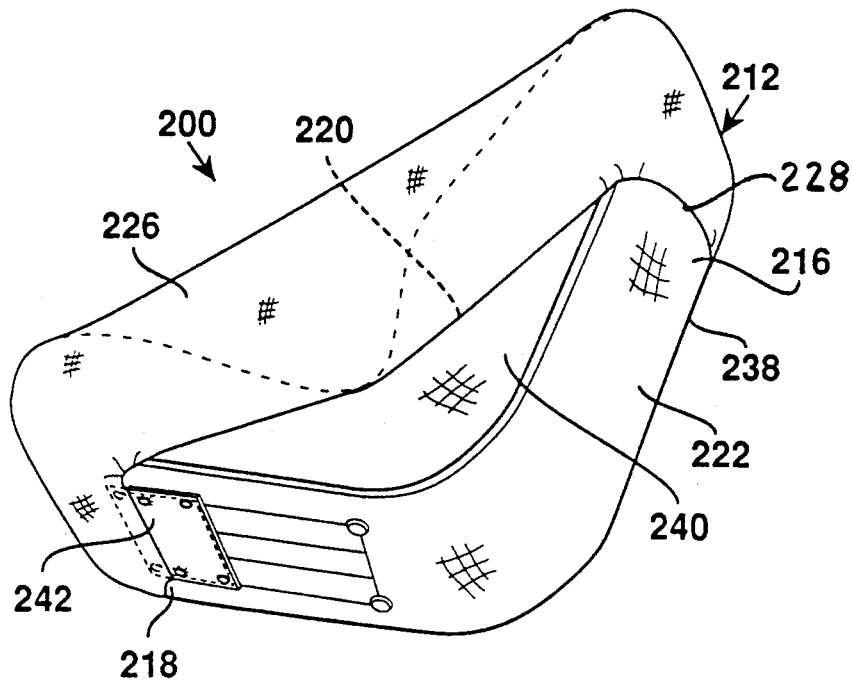
FIG. 6 depicts another alternative embodiment of the present seat cover wherein the seat cover is located on the front end of the seat.

The present seat cover 10 can also be adapted to the second end 18 of the seat 12, such as is illustrated in the FIG. 6. The cover indicated generally at 200 of FIG. 6 is virtually identical to that of the preferred cover 10, except that the jacket 226 and the pouch 242 are attached to the second end 218 or front portion of the seat 212 for easy access. As with the cover 10, the user simply removes the jacket 226 from the pouch 242 and stretches the free end 228 over the front side 220 of the seat 212 from the second end 218 to the first end 216. The free end 228 is removably secured to the second end 218, while the securing end 230 is removably or permanently attached to the pouch 242 or in the vicinity of the pouch 242 on the second end 218. Again, the jacket 226 is large enough to cover and protect at least the front side 220 and the sides 238 and 240 of the seat 212. This embodiment of seat cover 10 is particularly useful for applications involving auto seats or other types of permanently secured, nonpivotal, nonmovable seats.

In operation, when the user desires to cover the seat 12 to protect it from sun, wind or rain during periods of nonuse, the jacket 26 can be easily removed from the pouch 42 and pulled over, from the free end 28, to cover the front side 20 of the seat 12. As shown in FIGS. 1, 3, 5 and 6, the jacket 26 should fit tautly over the seat 12' to provide protection for substantially all of the seat 12. When the user decides to use the seat, the jacket 26 can be removed from the seat 12 by lifting or peeling the free end 28 from the second end 18 of the seat 12, and rolling, folding or otherwise collapsing the jacket 26 back into the inner pocket 44 of the pouch 42. If the jacket 26 is still wet, the user may decide to remove the jacket 26 from the seat 12, and if removably secured, either remove it from the pouch 42, or simply let the jacket 26 hang off the seat 12 until it dries. If the jacket is secured to the pouch 42 and the pouch 42 is removably secured to the seat 12, then the user can detach the pouch 42 and jacket 26 as a unit for cleaning, storage, replacement or application to another seat. If the jacket 26 alone is removably secured to the pouch 42 or seat 12, then the jacket 26 can be detached, cleaned, stored, replaced or applied to a different seat.

The jacket 26 can be retrieved from the pouch 42 without great effort, and easily stored back into the pouch 42. Since the cover 10 is attached to seat 12, the user need not waste time searching for or storing the covering. Instead, the user merely opens the pouch 42, unfolds the jacket 26, pulls the jacket 26 over the front side 20 of the seat 12 and secures the free end 28 to the second end 18 of the seat 12 so that the jacket 26 is taut over the seat 12. When it is desired to use the seat 12, the jacket 26 can be easily removed from the seat and quickly stored in the pouch 42 until it is again desired to use the cover 10 for the seat 12.

Thus, the preferred embodiment cover 10, or its alternative embodiments 100 and 200, can be adapted to a seat to cover and protect the seat from exposure to the elements. The present cover 10 is inexpensive to manufacture and easily adapted to most types of seats. The present cover 10 provides the user with an effective covering system to protect the seats of open aired vehicles, such as convertible automobiles or watercraft, without expending substantial amounts of money or time. The present cover 10 can be included by the manufacturer of the boat or auto as a special option, or it can be sold as an accessory. The cover 10 will help maintain the appearance of the seat, prevent the seat cushion from getting wet and prevent premature cracking or aging of the seat. Accordingly, the present cover 10 is a relatively inexpensive way to maintain the seats of an auto or boat, and thereby help to retain the overall value of the auto or boat.

While various embodiments of the present seat cover have been shown and described, it should be understood that various alternatives, substitutions and equivalents can be used, and the present invention should only be limited by the claims and equivalents thereof. Therefore, the terms and expressions serve only to describe the invention by example only and not to limit the invention. It is expected that others will perceive differences which, while differing for the foregoing, do not depart from the spirit and scope of the invention herein described and claimed.

Various features of the present invention are set forth in the following claims.

We claim:

1. A seat cover for covering and protecting a seat, the seat being of the type having a first end and a second end opposing the first end, the seat cover comprising:

a collapsible jacket having a securing end secured to one of the first and second ends of the seat and a free end that is releasably securable to the other of the first and second ends of the seat, said jacket having sufficient surface area to substantially overlie the seat between said first end and said second end;

securing means for releasably securing said jacket to the said one end of the seat;

a pouch having an inner pocket dimensioned to receive and store said jacket when said jacket is not in use, said pouch including a protective flap that covers the entry to said inner pocket;

said jacket having at least one strip of hook and loop fastening material secured to said securing end and arranged to mate with a complementary strip of hook and loop fastening material located on said pouch to removably secure said jacket to said pouch; and attaching means for attaching said pouch to the said other end of said seat.

2. The seat cover as defined in claim 1 wherein said jacket is made of a lightweight, water repellant material which also protects the seat from exposure to the sun.

3. The seat cover as defined in claim 1 wherein said securing means is a resilient material located at least along said free end of said jacket.

4. The seat cover as defined in claim 1 wherein said securing means comprises at least one strip of hook and loop fastening material located along said free end of said jacket and arranged to releasably engage complementary hook and loop fastening material located on the second end of the seat.

5. The seat cover as defined in claim 1 wherein said pouch is permanently attached to said one of said first and second ends of the seat.

6. The seat cover as defined in claim 1 wherein said attaching means comprises at least one strip of hook and loop fastening material that mates with a complementary strip of hook and loop fastening material located on the first end of the seat to permit selective removal of said pouch and said jacket as a unit from the seat.

7. A seat cover for covering and protecting a seat when the seat is not being used, the seat being of the type having a first end and a second end opposing the first end, the seat cover comprising:
   a collapsible jacket having a securing end secured to the first end of the seat and a free end that is releasably securable to the second end of the seat, said jacket dimensioned to substantially overlie the seat between said first end and said second end, said jacket being made of a water repellant material which is taut when stretched to cover the seat;
   a pouch having an opening providing access to an inner pocket, said pocket dimensioned for storing and protecting said jacket when said jacket is not in use, said pouch being secured to the first end of the seat;
   said pouch is removably secured to the first end of the seat with at least one strip of hook and loop fastening material arranged to mate with a complementary strip of hook and loop fastening material located on the first end of the seat, thereby permitting selective removal of said pouch together with said jacket as a unit from the seat; and
   said free end of said jacket being adapted to be removed from said pouch and be releasably secured to the second end of the seat to protect the seat from the elements, said jacket being collapsible for storage in said pouch.

8. The seat cover as defined in claim 7 wherein said jacket includes a resilient band of material located at least along said free end of said jacket for securing said jacket to the second end of the seat when said jacket is withdrawn from said pouch to cover the seat.

9. The seat cover as defined in claim 7 wherein said free end of said jacket includes at least one strip of hook and loop fastening material arranged to mate with a complementary strip of hook and loop fastening material located on the second end of the seat when said jacket is withdrawn from said pouch to cover the seat.

10. The seat cover as defined in claim 7 wherein said securing end of said jacket is permanently secured to said interior surface of said pouch.

11. The seat cover as defined in claim 7 wherein said securing end of said jacket is removably secured to said pouch with at least one strip of hook and loop fastening material that mates with a complementary strip of hook and loop fastening material located in said inner pocket of said pouch.

12. The seat cover as defined in claim 7 wherein said pouch is permanently secured to the first end of the seat.

13. The seat cover as defined in claim 7 wherein said pouch includes a protective flap configured and arranged to cover said opening of said pouch to protect said jacket stored within said inner pocket.

14. A combination cover and cover holder for covering and protecting a seat when the seat is not being used, the seat being of the type having a generally horizontal seat portion and a seat back portion, the upper surface of said seat portion and the front surface of said seat back portion defining a sitting area, the sides and bottom of said seat portion and the sides and back of said seat back portion defining a plurality of nonsitting areas, the seat cover comprising:
   a storage pouch having an opening providing access to an inner pocket, said pocket dimensioned for storing and protecting a jacket when said jacket is not in use, said jacket having at least a resilient outer periphery and being configured to cover at least a part of the sides of said seat portion and said seat back portion and substantially overlie and tautly cover the sitting area of the seat; and
   securing means for removably securing said storage pouch to at least one of the plurality of non-sitting areas of the seat such that said storage pouch is conveniently and unobstructively located on the seat, and thereby permits selective removal of said storage pouch together with said cover as a unit from the seat.

15. The combination cover and cover holder as defined in claim 14 wherein said pouch is located beneath a front end of said seat portion.

16. The combination cover and cover holder as defined in claim 14 wherein said pouch is located on one of said sides of said seat portion.

17. The combination cover and cover holder as defined in claim 14 wherein said pouch is located on a back side of said seat back portion.

18. The combination cover and cover holder as defined in claim 14 wherein said jacket is integrally formed with said inner pocket of said storage pouch.

19. The combination cover and cover holder as defined in claim 14 wherein said securing means is at least one strip of hook and loop fastening material located on said storage pouch such that it mates with a complementary strip of hook and loop fastening material located on any of the plurality of non-sitting areas of the seat, said jacket and storage pouch being removable as a unit from the seat.

20. The combination cover and cover holder as defined in claim 14 wherein said jacket includes a plurality of peripheral edges having elastic properties such that when said jacket is pulled over the sitting area, said jacket forms an inclined surface over the seat thereby preventing liquid from collecting over the sitting area.

* * * * *